United States Patent [19]

Weiner

[11] 4,159,844

[45] Jul. 3, 1979

[54] STORAGE DRAWER FOR MOBILE HOMES

[75] Inventor: Carl B. Weiner, Bloomfield Hills, Mich.

[73] Assignee: Metal Awning Components, Inc., Clawson, Mich.

[21] Appl. No.: 725,498

[22] Filed: Sep. 22, 1976

[51] Int. Cl.² .......................... B60R 7/00; B62D 25/20
[52] U.S. Cl. ................................ 296/37.1; 296/24 R; 312/341 R; 308/3.6
[58] Field of Search ................ 296/23 R, 24, 25, 37.1, 296/37.14, 78 R; 308/3.6; 224/42.41, 42.43, 42.44, 42.42 R; 312/341 R

[56] References Cited

U.S. PATENT DOCUMENTS

| 1,453,362 | 5/1923 | Loveland | 224/42.41 |
|---|---|---|---|
| 3,001,813 | 9/1961 | Johnson | 296/23 R |
| 3,287,058 | 11/1966 | Wells | 296/37.14 |
| 3,488,082 | 1/1970 | Wallace | 296/23 R |
| 3,973,814 | 8/1976 | Entrikin | 308/3.6 |

Primary Examiner—Richard A. Bertsch
Attorney, Agent, or Firm—Krass & Young

[57] ABSTRACT

A storage arrangement adapted to mobile homes and the like is disclosed comprised of a storage drawer which is supported beneath the under frame of such mobile home by means of a pair of support rails having a plurality of rollers mounted thereon which mate with corresponding roller tracks disposed in recesses formed in the sidewall of the drawer such that the storage drawer may be easily withdrawn from beneath the mobile home for access. The roller track extends about the entire periphery of the drawer so that the drawer may be installed with either its long sides or short sides extending into the clearance space. The drawer structure is made up of overlapping rolled aluminum panels which are adjustable in the degree of overlap such as to render the drawer depth adjustable for adaptation to differing ground clearances. The drawer is also adapted to be either top mounted or bottom mounted by being inverted with the floor of the drawer being located accordingly and the support rails being either mounted to the mobile home support beams or to concrete pads disposed on the ground surface, in both cases the roller tracks being clamped into position either on the mobile home support beams or on concrete pads on the ground undersurface so that the storage drawer may be readily installed.

4 Claims, 7 Drawing Figures

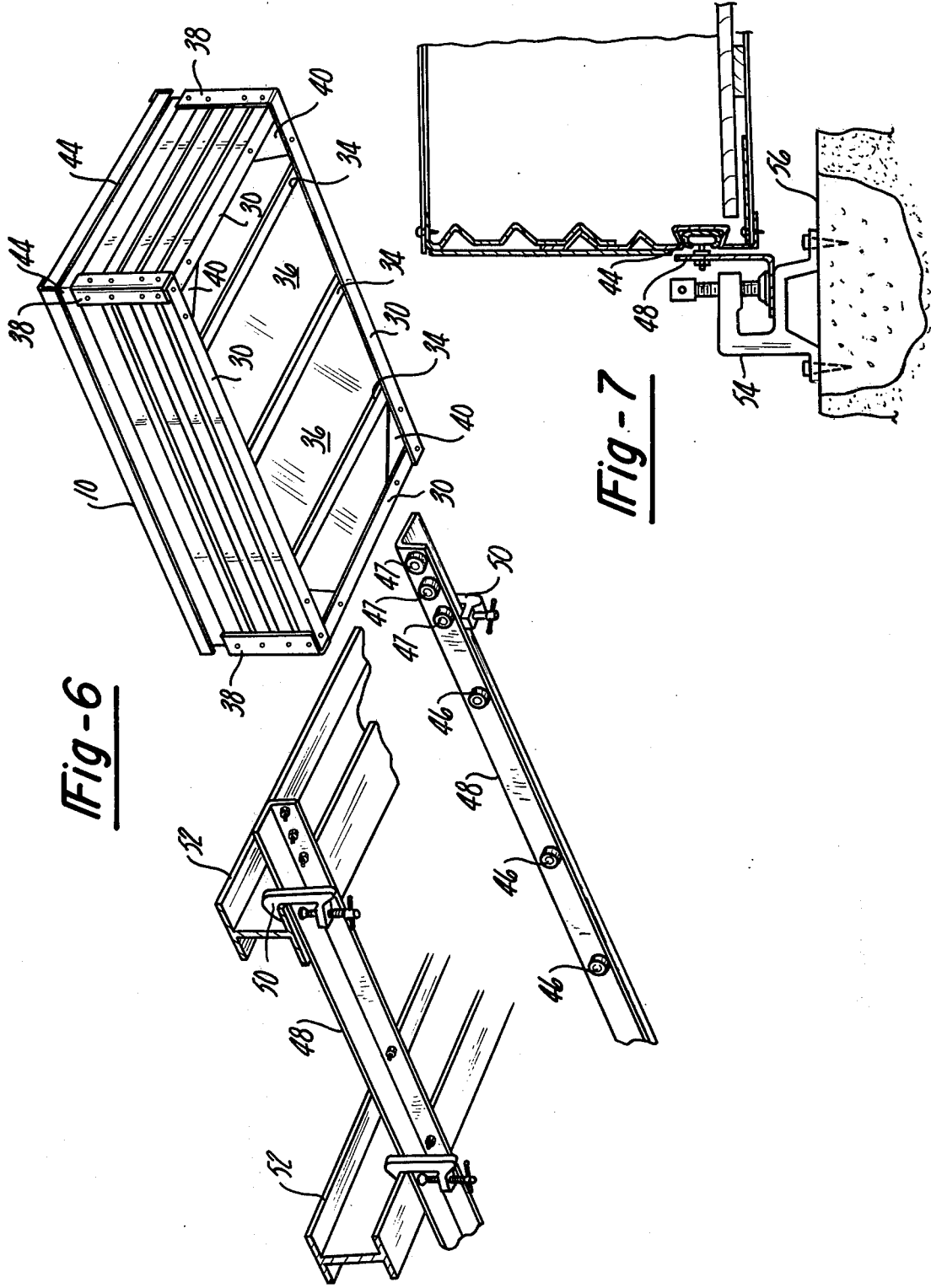

STORAGE DRAWER FOR MOBILE HOMES

BACKGROUND OF THE INVENTION

1. Field of the Invention

This invention concerns storage arrangements and more particularly storage arrangements which are adapted to utilize the space underneath mobile homes and similar structures.

2. Brief Description of the Prior Art

Storage facilities for mobile homes have in the past been generally unsatisfactory since the space within the structure itself is limited and the size of the mobile home lot is somewhat constraining, such that this aspect of mobile home living has remained as relatively inconvenient. A potential source of space is the clearance space between the under structure of the mobile home defined by the support beams thereof and the ground surface but this space is relatively inaccessable and has not herefore been conveniently usable by mobile home dwellers.

Any storage structures intended for application to mobile homes should be relatively low in cost since mobile home dwellers are generally less affluent than the owners of conventional housing and should be adapted to the do-it-yourself market for this same reason. On the other hand, a sizeable proportion of mobile home dwellers are the elderly and installation and assembly requirements should be relatively simple and straightforward and not require the extensive use of power tools, etc.

The relatively great variety of mobile home configurations also requires that any such arrangement be adapted to many varying configurations, such adaptations desirably being carried out with relatively simple modifications.

Finally, any such arrangement should be aesthetically compatible with the exterior lines of the mobile home, in order to present a pleasing external appearance.

Accordingly, it is an object of the present invention to provide an arrangement for storage which is adapted to utilize the clearance space described above for mobile homes or the like which renders such space readily accessible.

It is another object of the present invention to provide such an arrangement which is relatively low in cost and adaptable to do-it-yourself installation.

It is a further object of the present invention to provide such an arrangement which is easily adapted to widely varying mobile home configurations and which is compatible in appearance with the exterior lines thereof to be aesthetically pleasing when installed.

SUMMARY OF THE INVENTION

These and other objects which will become apparent upon a reading of the following specification and claims is accomplished by the provision of a storage enclosure which is movably supported within the mobile home clearance space, the storage enclosure being provided by a rectangular drawer mounted for sliding movement into and out of the clearance space on a pair of roller tracks, the storage drawer being capable of either a top or bottom mounting installation by being inverted and also being adapted to be oriented with its wide or short side surfacing on the exterior of the mobile home by virtue of the provision of a mating roller track mounted in the drawer sides and extending about the entire periphery of the storage drawer. The storage drawer is also adjustable in depth by virtue of a sidewall construction consisting of overlapping rolled aluminum panels with the degree of overlap providing a depth adjustment. The facing of the storage drawer may be provided by the mobile home skirting material pre-existing on the mobile home installation such that the storage drawer in the closed position blends into the existing lines of the mobile home.

DESCRIPTION OF THE DRAWINGS

FIG. 6 is a perspective view of the underside of the storage drawer shown in FIG. 6 with a fragmentary view of the installation of the guide rails on the guide beam of the mobile home;

FIG. 7 is a sectional view of a storage drawer mounted with the guide rails mounted on concrete pads installed in the ground surface beneath the mobile home.

DETAILED DESCRIPTION

In the following detailed description certain specific terminology will be employed and a particular embodiment described for the sake of clarity in accordance with 35 USC 112 but this should not be construed as being as intent to so limit the invention, but rather the inventive concept is capable of many differing manifestations within its scope.

Figure 1:
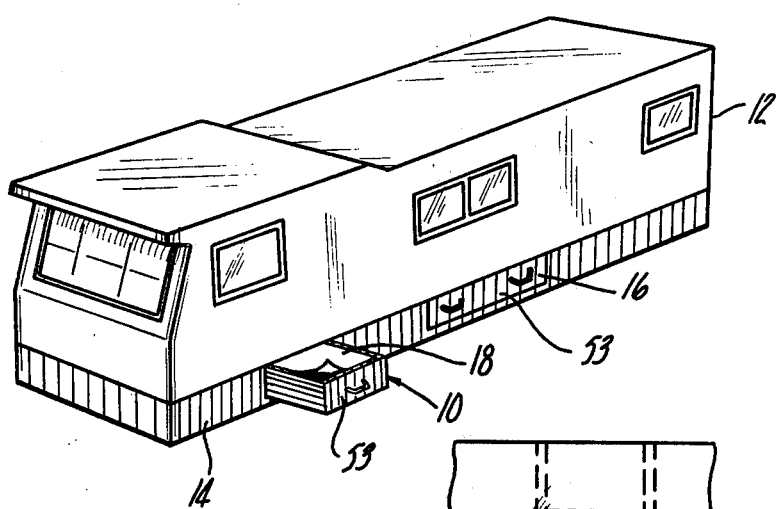
FIG. 1 is a perspective view of a mobile home in which storage drawers according to the present invention have been installed.

Referring to the drawings, and particularly FIG. 1, the arrangement according to the present invention is constituted by a storage enclosure assembly consisting of a drawer-like unit 10 which is adapted to be movably mounted for movement into and out of the clearance space under a mobile home 12 in the region normally enclosed by the mobile home skirting 14 so as to be withdrawn easily to render the interior accessible and upon return thereof to be flush with the exterior surface of the mobile home 12 as shown by a second retracted drawer 16. The depth of the drawers 10 and 16, as seen in the FIGURES, is such that the clearance space is substantially occupied by the drawers 10 and 16 to convert this space to storage purposes in a highly convenient manner. The top portion thereof may be covered by means of a snap-on covering 18 as shown in FIG. 1.

Figure 2:
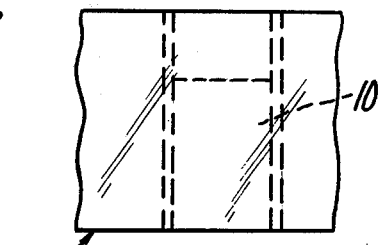
FIG. 2 is a diagrammatic representation of the first installation orientation of the storage drawer with the relatively deep dimension of the drawer extending under the mobile home.
Figure 3:
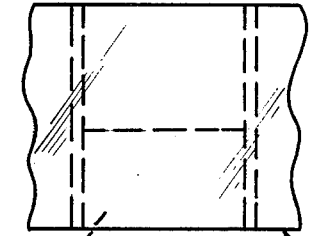
FIG. 3 is a diagrammatic representation of an alternate orientation of a storage drawer with the relatively shallow dimension of the drawer extending under the mobile home.

The details of construction, as will hereinafter be disclosed, allow for a reorientation of the storage drawers as represented in FIGS. 2 and 3, that is, the drawer 10 may be mounted as the drawer 10 is shown, with its longer sides extending underneath the mobile home 12, or alternatively, the storage drawer may be rotated such that its shorter sides extend underneath the mobile home 12 as depicted by the retracted drawer 16.

Figure 4:
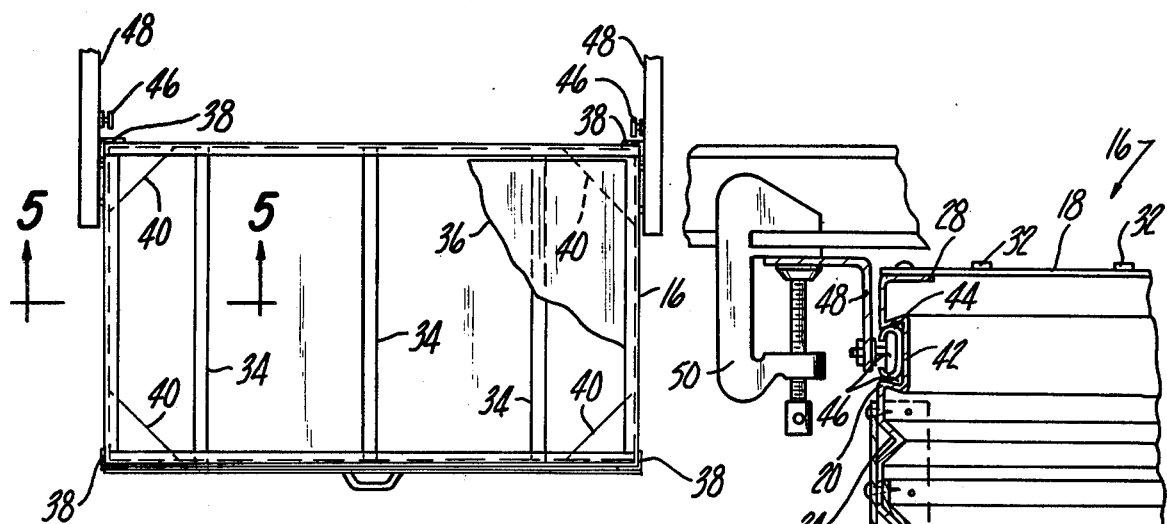
FIG. 4 is a bottom view of the storage drawer with a fragmentary view of the roller tracks with the bottom thereof broken away to show the support slats.
Figure 5:
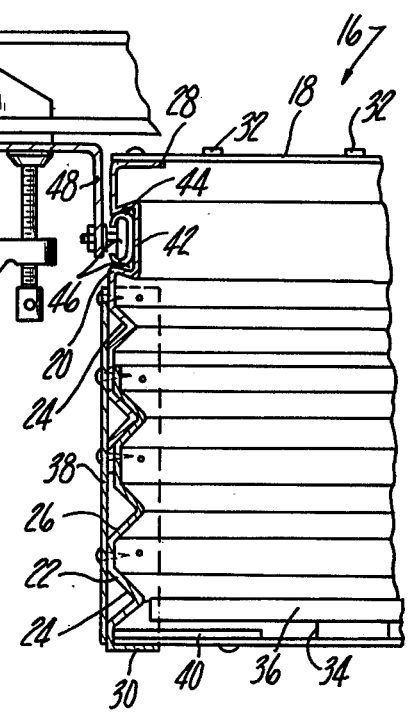
FIG. 5 is a view of the section taken along 5—5 in FIG. 4.

Referring to FIGS. 4-6, the details of construction are shown. The drawer 16 itself is constructed of four connected side sections each formed by overlapping panel sections 20 and 22 formed of aluminum sheets, each having corresponding rolled in corrugations 24 and 26 respectively which are similarly shaped so as to allow adjustability in overlap of the respective panel sections 20 and 22 as shown in FIG. 5 with the degree of overlap depending on the number of corrugations which are positioned to nest one within the other. Panel sections 20 each have formed thereon an inwardly directed flange 28 while panel sections 22 have an inwardly directed flange section 30. Flange 28 as shown in FIG. 5, provides a mounting surface for the tarp snaps 32 while flange 30 provides a retaining lip for slat members 34 supporting a bottom panel 36. As will be described hereinafter in detail, the storage drawer 16 may be inverted so as to be supported about the lower region thereof and in this instance the respective rolls of flanges 28 and 30 would be reversed.

The side panels 20 and 22 may be secured together by means of sheet metal screws, bolts, rivets, etc. passing through the overlapping sections. At the corners each respective panel assembly is secured to each other by a series of corner angles 38 which would be trimmed if necessary corresponding to the adjusted drawer depth. Bottom corner gussets 40 may also be provided, fastened to the flange sections 30 by sheet metal screws or bolts.

Panel sections 20 have rolled therein a U-shaped corrugation 42 with inwardly sloping sidewalls such as to be capable of retaining a steel track groove section 44 adapted to receive a plurality of support rollers 46. The support rollers are mounted to lengths of steel angles providing a roller support rail 48 positioned on each side of the storage drawer 10 and 16 in spaced apart relationship as shown in FIG. 6 with the outer rollers 47 being relatively closely spaced to support and stabilize the drawer 10 or 16 in the extended position. The roller support rails 48 are installed by means of clamps 50 each adapted to simultaneously clamp a roller support rail 48 and a mobile home support I-beam normally comprising the understructure of mobile homes. As seen in FIG. 6, the clamping is carried out on each of the I-beams 52 normally included in mobile home construction to provide secure positioning of the roller support rail 48 without the need for drilling holes in the I-beams, etc. so that installation may be quickly and easily carried out without power tools.

A matching mobile home skirting 53 (FIG. 1) would normally be applied to the front surface of the drawer so that the surface would blend into the existing mobile home skirting for a neat finished appearance. This could advantageously be done by reinstalling the sections of skirting removed to create the opening into which the drawers 10 and 16 would be installed.

As shown in FIG. 7, track sections 44 are installed so as to extend entirely about the periphery of the storage drawers 10 and 16 to provide the reorientation capability referred to above.

This also allows a bottom installation as shown in FIG. 7 in which stationary clamping devices 54 are secured in concrete pads 56 which may be poured in place into the ground beneath the mobile home at appropriate spaced locations. The clamping devices 54 are adapted to clamp the roller support rails 48 in similar fashion with the storage drawers 10 and 16 being inverted such that the panels 44 are positioned in alignment therewith. As noted above, the slats 34 and bottom panel 36 as well as the gussets 40 would in this instance be installed on the flange 28 of panel section 24.

It can thus be seen that the arrangement described herein achieves the objects of the invention as set forth above and that the clearance space beneath the mobile home 12 is effectively made use of by the means allowing ready slide-out of the enclosure defined by the storage drawers 10 and 16 so as to provide ready accessability thereto. Furthermore, this means has been provided by an arrangement which is adapted to be assembled and installed at relatively low cost by the average mobile home dweller, quickly and easily and without the necessity of using power tools or other special equipment. Furthermore, the adjustability in depth as well as in mounting mode, i.e. either overhead or ground support renders the storage drawer installation quite adapted to application to the widely varying sizes and configurations of the mobile homes. It can also be appreciated that the finished installation would be aesthetically quite pleasing in that it would be blended clearly into existing mobile home exterior lines.

Many variations of the specific details disclosed herein are of course possible, and furthermore, while the storage drawer arrangement according to the present invention has particular suitability to mobile homes, the same concept could be adapted to other shelter structures in which there is such an under clearance space which is relatively inaccessible, such as homes built on a crawl space in which the siding material and framing construction is such that installation of the drawers would be feasible. Also while the particular construction and installation scheme have been adapted to the do-it-yourselfer, it is of course within the scope of the present invention that this arrangement be includable in original installations by the manufacturer of mobile homes in which case the specifics of installation would of course be quite different, i.e. the tracks would likely be permanently affixed to the mobile home under structure.

The embodiments of the invention in which an exclusive property or privilege is claimed are defined as follows:

1. A storage arrangement in combination with a mobile home structure supported above the ground with a clearance space between a bottom section of said mobile home and the ground, the storage arrangement comprising:
   a storage enclosure assembly consisting of a rectangular drawer structure having four connected sides and a bottom panel mounted thereto, said drawer structure sides each comprised of a pair of overlapping panel sections, whereby said drawer structure depth may be adjusted by adjusting the extent of overlap;
   support means supporting said storage enclosure assembly for movement into and out of said clearance space, whereby access to said clearance space for storage purposes is provided.

2. An improved mobile home of the type including a home structure and a supporting understructure, said understructure comprised of a plurality of support beams supported above the ground surface with a clearance space therebetween, the improvement comprising a storage arrangement including a storage enclosure assembly of a depth to substantially occupy said clearance space provided by a rectangular drawer structure consisting of four connected sides and a bottom mounted thereto; and support means supporting said storage enclosure assembly for movement into and out of said clearance space; means mounting said drawer structure for slidable movement into and out of said clearance space including a pair of support rails, means supporting said support rails within said clearance space, and further including means slidably supporting said drawer structure on said support rails for movement into and out of said clearance space, including a track groove in said drawer structure sides extending about the entire periphery of said drawer structure and further including a plurality of rollers mounted on each of said support rails and adapted to be received within and into engagement with said track grooves, whereby said drawer structure is slidably mounted on said support rails, whereby access to said clearance space beneath said mobile home is provided.

3. A storage arrangement in combination with a mobile home structure supported above the ground with a clearance space between a bottom section of said mobile home and the ground, the storage arrangement comprising:

a storage assembly consisting of a rectangular drawer structure having four connected sides and a bottom panel mounted thereto, wherein said rectangular drawer structure is dimensioned with one side dimension longer than the other, and wherein said means supporting said storage enclosure includes means engageable with both said longer and shorter sides, whereby said drawer may thereby be supported so as to be oriented with either said longer or shorter sides extending into said clearance space;

support means supporting said storage enclosure assembly for movement into and out of said clearance space, including a track groove in said drawer structure side extending entirely about the periphery of said drawer structure and also including support means adapted to supportingly engage a portion of said groove during said movement in and out of said clearance space, including a pair of support rails and means mounting said pair of support rails in said clearance space including a plurality of concrete pads supported on the ground and clamping means affixed to said concrete pads supporting said pair of support rails and a plurality of rollers supported on each of said support rails and adapted to be received into said groove, whereby said support is provided by said rollers, whereby access to said clearance space for storage purposes is provided.

4. An improved mobile home of the type including a home structure and a supporting understructure, said understructure comprised of a plurality of support beams supported above the ground surface with a clearance space therebetween, said mobile home including a skirting panel affixed thereto and extending about the periphery of said mobile home, the improvement comprising a storage arrangement including a storage enclosure assembly of a depth to substantially occupy said clearance space; and support means supporting said storage enclosure assembly for movement into and out of said clearance space, said storage enclosure assembly having complementary skirting affixed to the side portion thereof positioned exteriorly of said mobile home on said side adapted to be positioned flush with said skirting upon retraction of said storage enclosure assembly, whereby access to said clearance space beneath said mobile home is provided.

* * * * *